(12) United States Patent
Preszler et al.

(10) Patent No.: US 12,053,720 B2
(45) Date of Patent: Aug. 6, 2024

(54) DOWNHOLE GAS SEPARATOR

(71) Applicant: WESTERN INTELLECT LLC, Watford City, ND (US)

(72) Inventors: Kent Preszler, Littleton, CO (US); William Carlson, Watford City, ND (US)

(73) Assignee: WESTERN INTELLECT LLC, Watford City, ND (US)

( * ) Notice: Subject to any disclaimer, the term of this patent is extended or adjusted under 35 U.S.C. 154(b) by 10 days.

(21) Appl. No.: 17/576,289

(22) Filed: Jan. 14, 2022

(65) Prior Publication Data
US 2023/0226465 A1 Jul. 20, 2023

(51) Int. Cl.
*B01D 19/00* (2006.01)
*E21B 43/38* (2006.01)

(52) U.S. Cl.
CPC .......... *B01D 19/0042* (2013.01); *E21B 43/38* (2013.01)

(58) Field of Classification Search
CPC .................. B01D 19/00–0495; E21B 43/38
USPC ............... 96/155–220; 95/241–266; 166/265
See application file for complete search history.

(56) References Cited

U.S. PATENT DOCUMENTS

| | | | | |
|---|---|---|---|---|
| 4,424,068 A * | 1/1984 | McMillan | ............... | E21B 43/34 96/183 |
| 5,711,374 A * | 1/1998 | Kjos | .......... | B04C 5/24 166/243 |
| 6,080,312 A * | 6/2000 | Bowers | .......... | B04C 5/28 210/512.1 |
| 6,116,341 A * | 9/2000 | Stuebinger | .......... | E21B 43/385 166/265 |
| 6,138,758 A * | 10/2000 | Shaw | .......... | B04C 5/26 166/372 |
| 6,179,054 B1 * | 1/2001 | Stewart | .......... | E21B 43/38 166/265 |
| 6,182,751 B1 * | 2/2001 | Koshkin | .......... | E21B 43/127 166/105.5 |
| 6,494,258 B1 * | 12/2002 | Weingarten | .......... | E21B 43/38 166/265 |
| 6,627,081 B1 * | 9/2003 | Hilditch | .......... | E21B 43/38 210/512.1 |
| 8,080,157 B2 * | 12/2011 | Fenton | .......... | E21B 43/385 210/522 |
| 10,415,361 B1 * | 9/2019 | Zahran | .......... | E21B 43/38 |
| 2003/0051874 A1 * | 3/2003 | Munson | .......... | E21B 43/38 210/512.2 |

(Continued)

*Primary Examiner* — T. Bennett McKenzie
(74) *Attorney, Agent, or Firm* — Polsinelli PC (57) ABSTRACT

A gas separator for removing suspended gas from a fluid is provided. A plurality of pipes define an overall fluid pathway that includes: a first fluid path from the first fluid chamber to the third fluid chamber, the first fluid path passing through the second fluid chamber without interacting with contents the second fluid chamber, the first fluid pathway being narrower than the first fluid chamber such that fluid flows through the first fluid pathway faster than through the first fluid chamber; a second fluid path from the third fluid chamber to the second fluid chamber, the second fluid path extending at least partially along an exterior wall of the second and third fluid chamber; and a third fluid path from the second fluid chamber to the fourth fluid chamber, the third path passing through the second fluid chamber without interacting with content of the second fluid chamber.

10 Claims, 13 Drawing Sheets

(56) References Cited

U.S. PATENT DOCUMENTS

| | | | |
|---|---|---|---|
| 2004/0238179 A1* | 12/2004 | Murray | E21B 43/38 |
| | | | 166/105.5 |
| 2013/0032341 A1* | 2/2013 | Raglin | E21B 43/38 |
| | | | 166/265 |
| 2016/0138380 A1* | 5/2016 | McCoy | E21B 43/38 |
| | | | 166/265 |
| 2016/0201444 A1* | 7/2016 | Hardee | E21B 43/128 |
| | | | 166/265 |
| 2017/0081952 A1* | 3/2017 | Osborne | B60R 9/10 |
| 2018/0187531 A1* | 7/2018 | Ellithorp | E21B 43/127 |
| 2020/0131873 A1* | 4/2020 | Saponja | E21B 34/12 |

* cited by examiner

DOWNHOLE GAS SEPARATOR

FIELD OF THE INVENTION

Various embodiments described herein relate generally to a downhole gas separator. More specifically, various embodiments herein relate to a gas separator that agitates fluid to release gas, direct released gas to the surface while collecting degassed fluid for further processing.

BACKGROUND

Surface stationed pump jacks are used to extract underground fluid such as oil from wells. A sucker rod extends from the pump jack down into the well. The pump jack generates a reciprocating motion that cyclically raises and lowers the sucker rod. A single cycle of the pump jack, known as a pumping stroke, raises the sucker rod on the upstroke and lowers the sucker rod on the downstroke.

A series of valves at the resource extraction level in the well coordinate with movement of the sucker rod to pump fluid to the surface during each pumping stroke. The valves include a traveling valve at the end of the sucker rod, and a standing valve set inside the well. On the upstroke, the traveling valve is closed while the standing valve is open, such that upward movement of the riding valve draws underground fluid into the space between the two valves. On the downstroke, the standing valve is closed to prevent the pumped fluid from flowing back down the well, while the traveling valve is open to allow the sucker rod to extend further down the well.

The efficiency of the pump jack is based on how much of the energy translates into fluid motion. Ideally, 100% of the energy from the pumping stroke would translate into movement of the fluid. However, the fluid can be a combination of gas, liquid, and solid particulate matter (e.g., sand and rocks). When suspended gas is present, some of the energy of the pumping motion is wasted by expanding or compressing the suspended gas, and can reduce efficiency down to the order 40%

The oil and gas industry would like to reach a pump jack efficiency of 90% or better. Various methodologies have been proposed to separate suspended gas from the fluid to thereby increase efficiency. In practice, these methodologies fall short of that goal.

DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and, such references mean at least one of the embodiments.

Reference to any "example" herein (e.g., "for example", "an example of", by way of example" or the like) are to be considered non-limiting examples regardless of whether expressly stated or not.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., re labels to distinguish components or blocks of otherwise similar names, but does not imply any sequence or numerical limitation. When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

In the concept of any specific pipe of fluid conduit, "external" or the like refers to an area outside the pipe, and "internal" or the like refers to the interior of the pipe. A surface that is "externally facing" or the like is facing away from the central axis of the pipe, and a surface that is "internally facing" or the like is facing toward the central axis of the pipe.

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure.

All temperatures herein are in Fahrenheit unless otherwise specified.

Shapes as described herein are not considered absolute. As is known in the art, surfaces often have waves, protrusions, holes, recesses, etc. to provide rigidity, strength and functionality. All recitations of shape (e.g., cylindrical) herein are to be considered modified by "substantially" regardless of whether expressly stated in the disclosure or claims, and specifically accounts for variations in the art as noted above.

"Fluid" means liquid and/or gas, including gas suspended in fluid.

"Degassed fluid" means a remainder after fluid goes through a process to remove suspended gas therein. Degassed fluid may still have gas suspending therein, although usually less than prior to the degassing process.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

Figure 1:
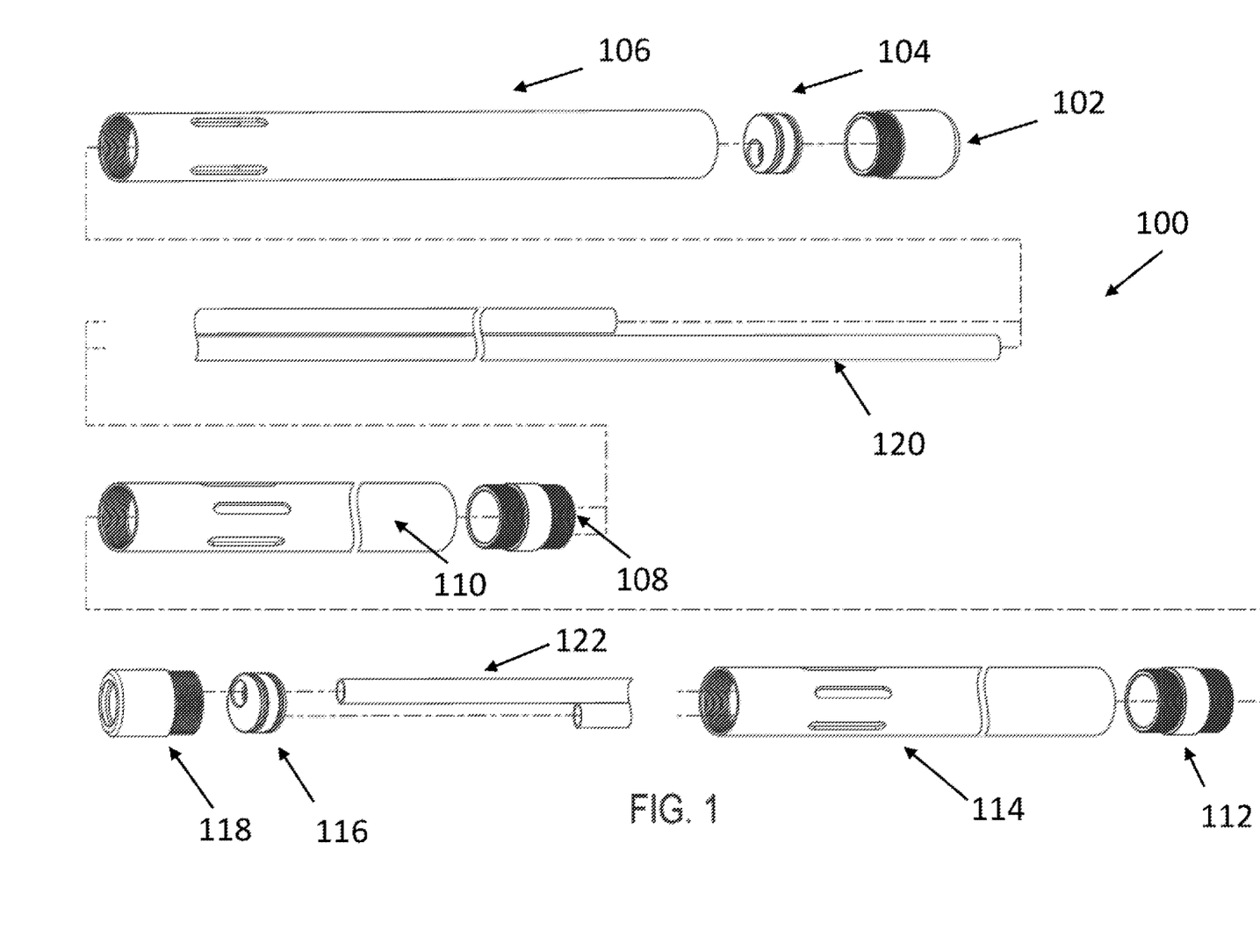
FIG. 1 shows an exploded perspective view of an embodiment of the invention.
Figure 2A:
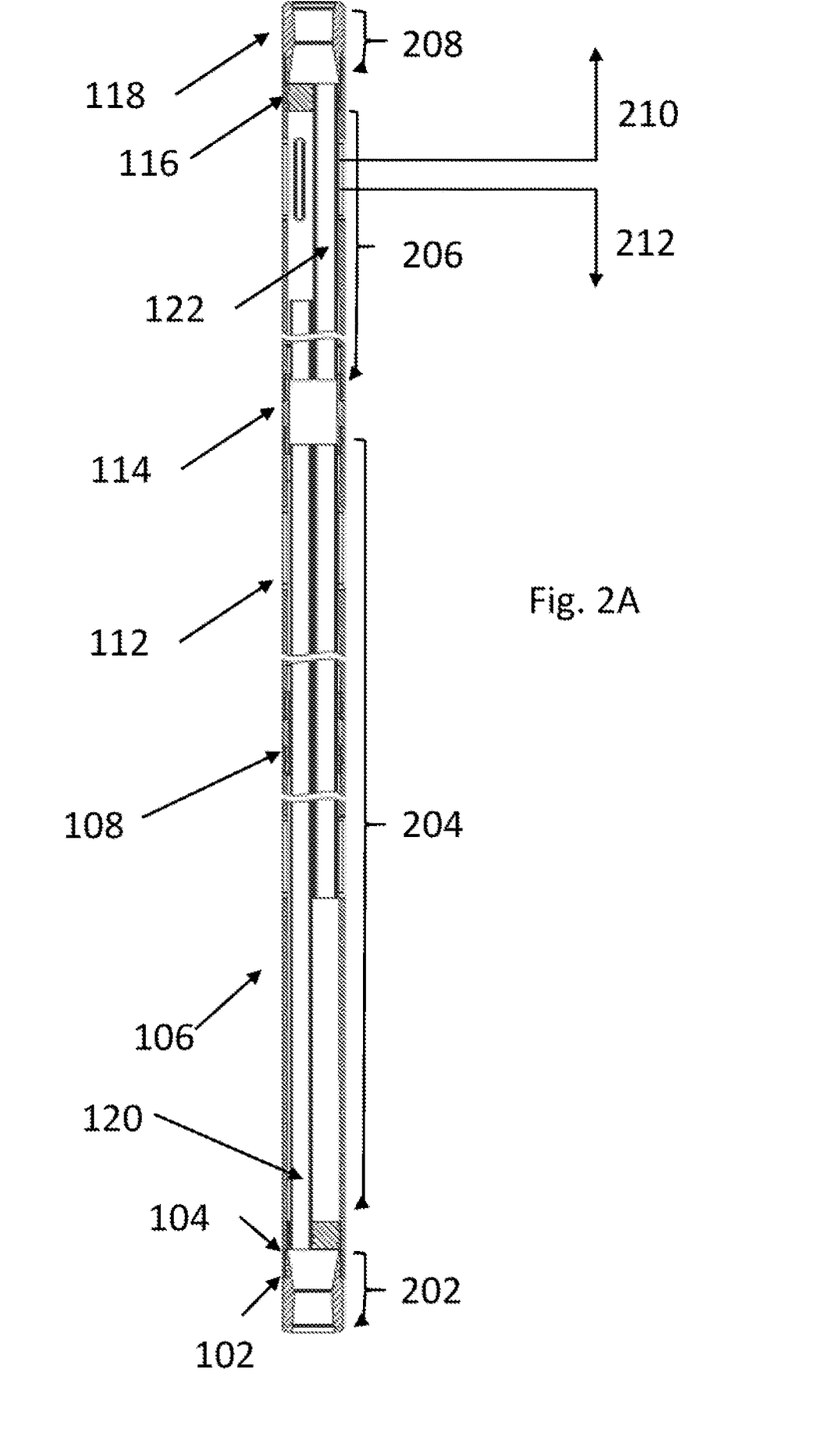
FIGS. 2A and 2B are cross section side views of the embodiment of FIG. 1.
Figure 2B:
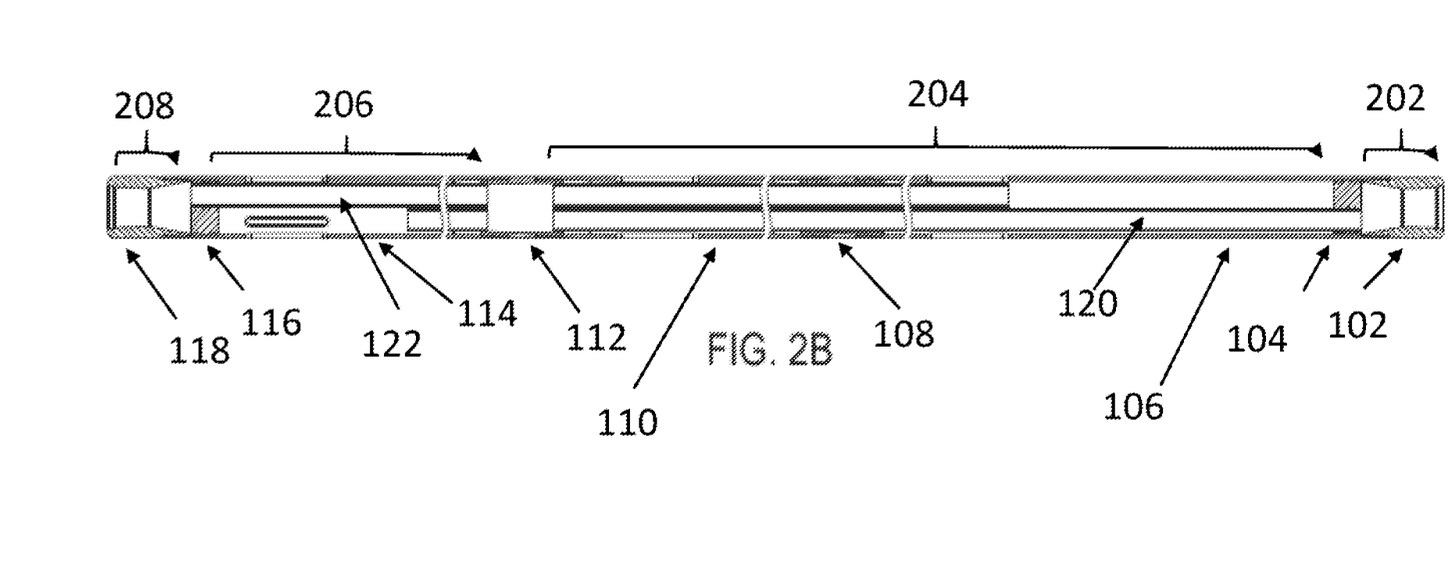

Referring now to FIGS. 1 and 2, components of a gas separator 100 is shown. The gas separator includes a first connector bushing 102, a first plug 104, a first external pipe 106, a connector 108, a second external pipe 110, a second plug 112, a third external pipe 114, a third plug 116, and a second connector bushing 118. A first internal pipe 120 and a second internal pipe 122 are mounted relative to the above components as discussed below.

Figure 3A:
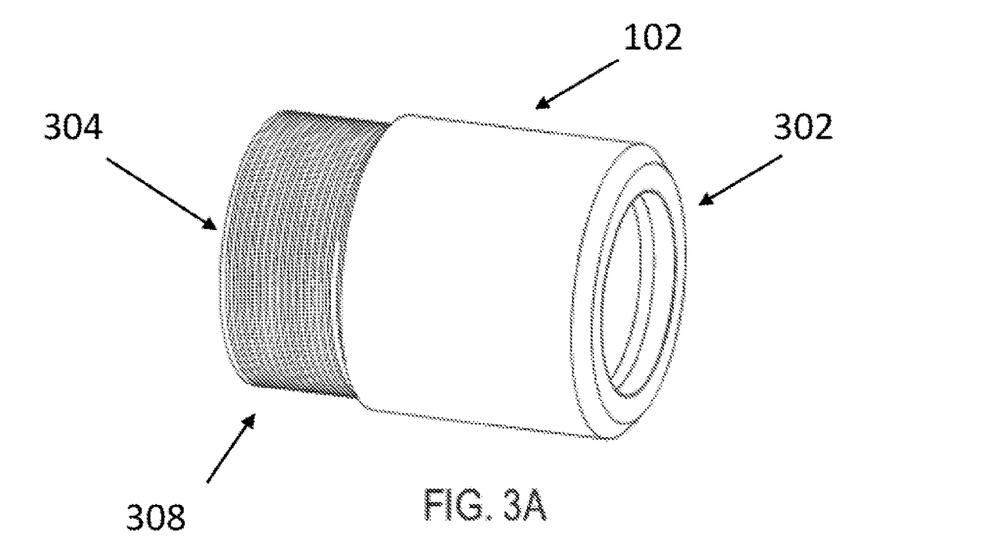
FIGS. 3A-3C are perspective, front, and cross sectional views of a connector bushing according to an embodiment of the invention.
Figure 3B:
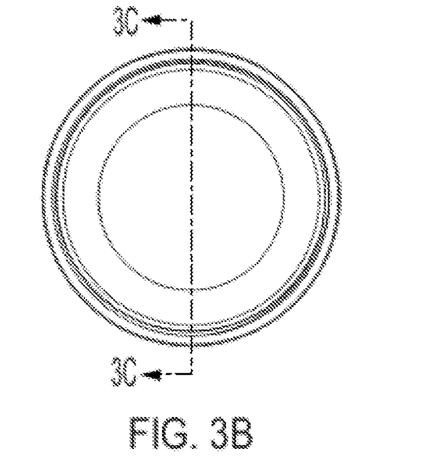
Figure 3C:
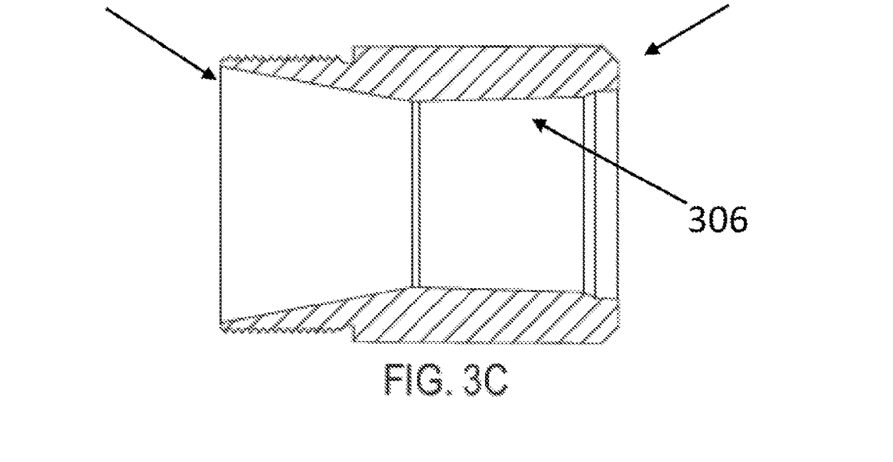

Referring now to FIGS. 3A-3C, first connector bushing 102 is shown in more detail. First connector bushing 102 has an overall cylindrical shape, with a first end 302 and a second end 304. The first end 302 had a cylindrical interior with interior facing threads in region 306 to engage with other components (discussed below). The second end 304 has outwardly facing threads 308 which surrounds a frustoconical (i.e., a partial cone) shape. As discussed in more detail below, the second end 304 of first connector bushing 102 will screw onto first external pipe 106 to hold first plug 104 in place.

Figure 4A:
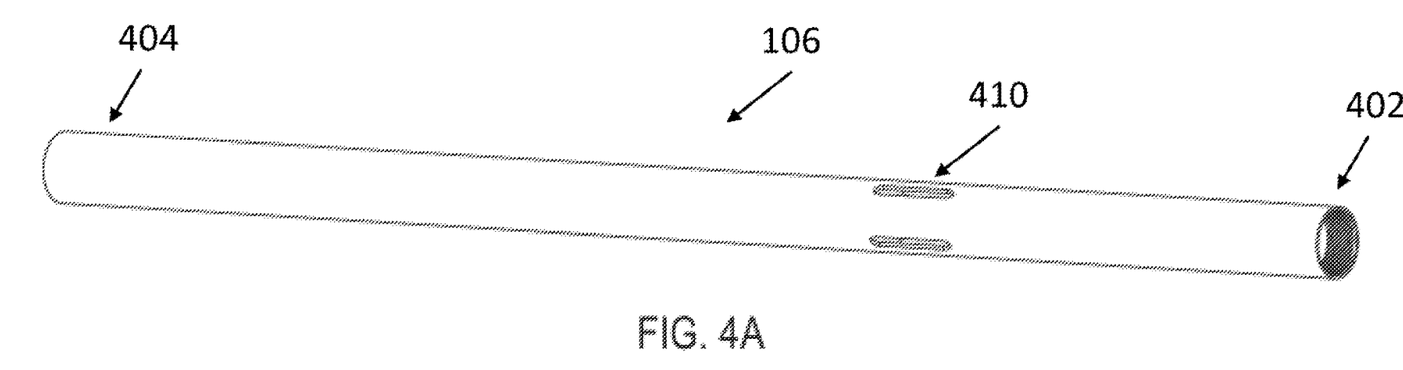
FIGS. 4A and 4B are perspective and cross sectional views of a first pipe according to an embodiment of the invention.
Figure 4B:
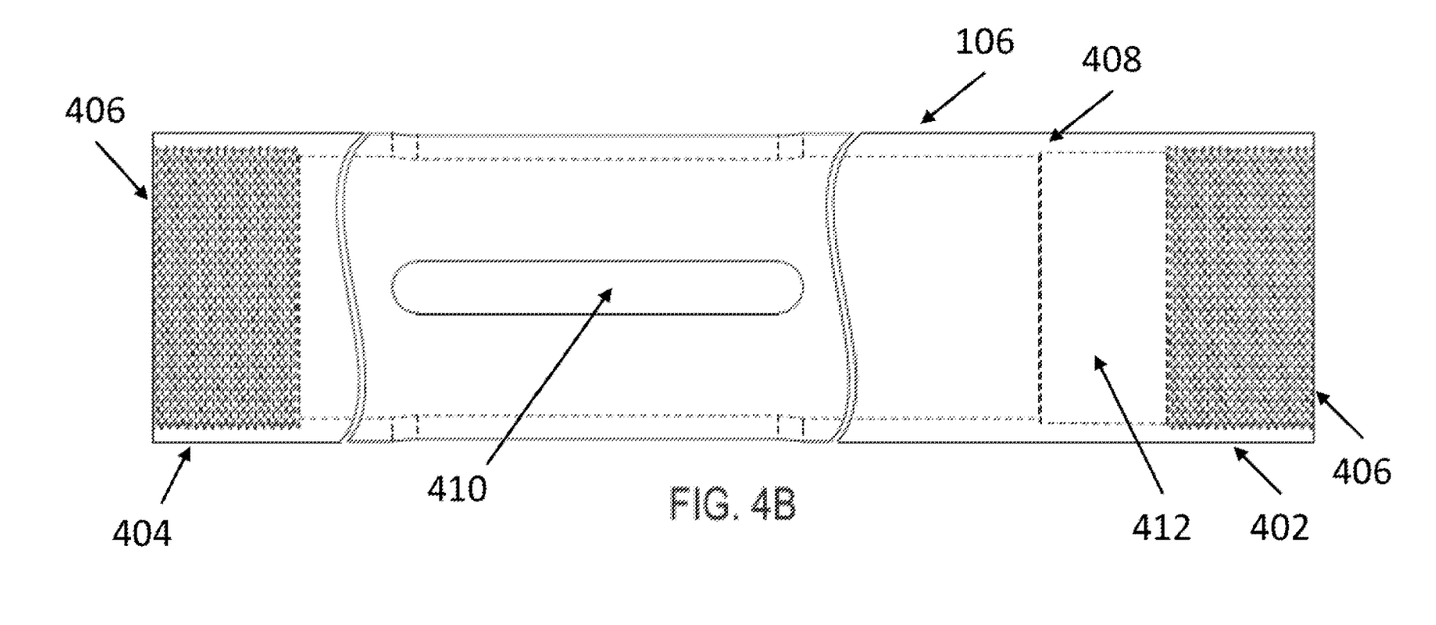

Referring now to FIGS. 4A-B, the first external pipe 106 is shown in more detail. First external pipe 106 has an overall cylindrical shape, with a first end 402 and a second end 404. Both the first and second ends 402 and 404 have internally facing threads 406. The interior of first external pipe 106 has a slightly larger diameter at the first end 402, thereby defining a lip 408. An interior portion of first external pipe 106 between the first end 402 and the lip 408 defines a cavity 412 that will receive the first plug 104. One or more openings 410 in the side wall of first external pipe 106 allow fluid to enter or exit through the sides of first external pipe 106.

When first plug 104 is inserted into cavity 412, the second end 304 of first connector bushing 102 will screw on the first end 402 of first external pipe 106, thereby locking first plug 104 in place.

Figure 5A:
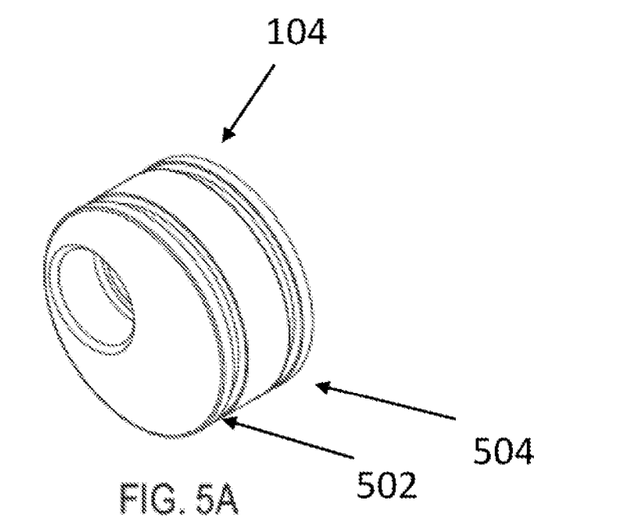
FIGS. 5A-5C are perspective, front, and cross sectional views of a first plug according to an embodiment of the invention.
Figure 5B:
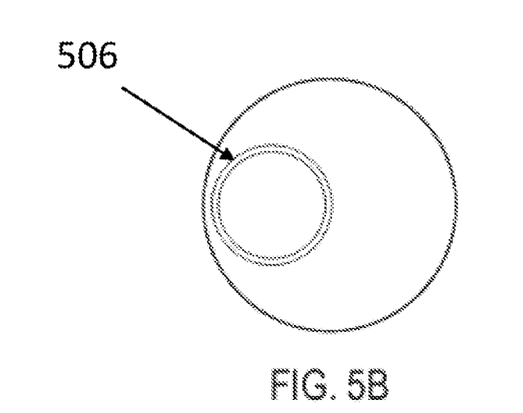
Figure 5C:
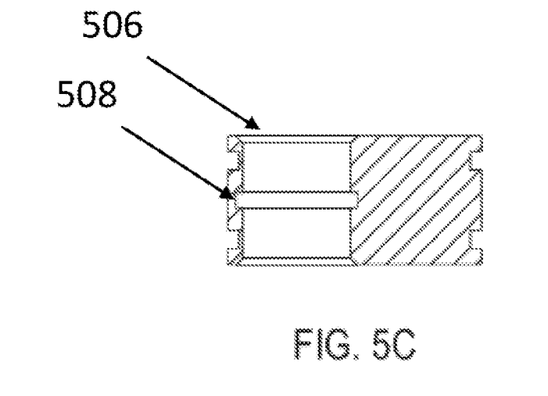

Referring now to FIG. 5A-5C, first plug 104 is shown in more detail. First plug 104 has an overall cylindrical exterior shape with one or more recesses 502 along the periphery for receiving O-ring seals (not shown). First plug 104 has an exterior size and shape such that, in combination with the O-rings 504 will snuggly fit within cavity 412 of first external pipe 106.

First plug 104 has a solid interior with a cylindrical first bore 506. First bore 506 is offset from the center of first plug 104, and preferably is located between the center of first plug 104 and the outer periphery of first plug 104. First bore 506 has a cylindrical interior with at least one recesses 508 along its periphery for receiving O-ring seals (not shown). First bore 506 has an interior size and shape such that, in combination with the O-ring seals, will snuggly accommodate first internal pipe 120.

Figure 6A:
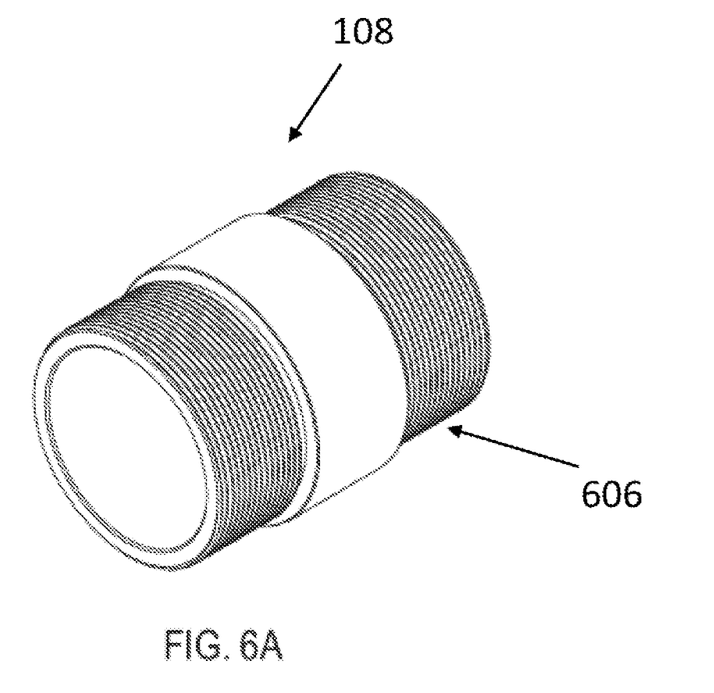
FIGS. 6A and 6B are perspective and cross sectional views of a connector according to an embodiment of the invention.
Figure 6B:
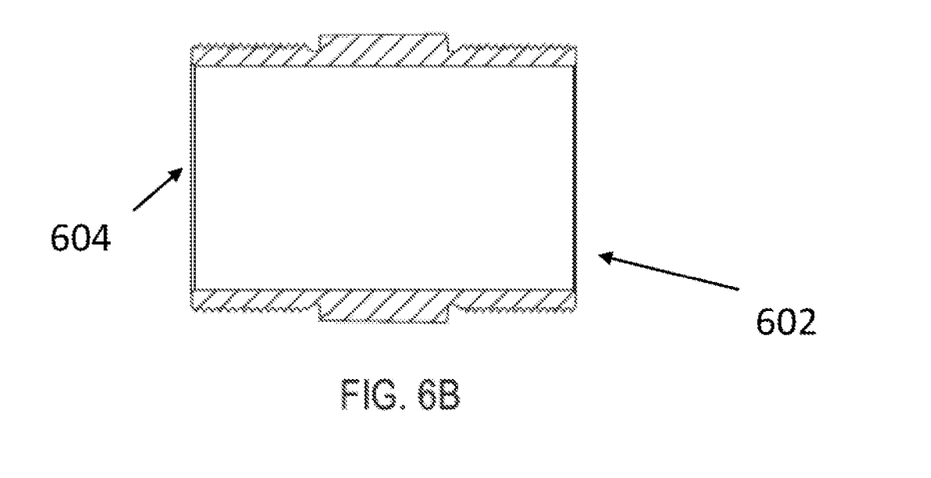

Referring now to FIGS. 6A-B, connector 108 is shown in more detail. Connector 108 has a first end 602 and a second end 604, and a hollow interior. Both the first and second ends 602 and 604 have externally facing threads 606. First end 602 of connector 108 will engage with second end 404 of first external pipe 106. Second end 604 of connector 108 will engage with second external pipe 110.

Figure 7A:
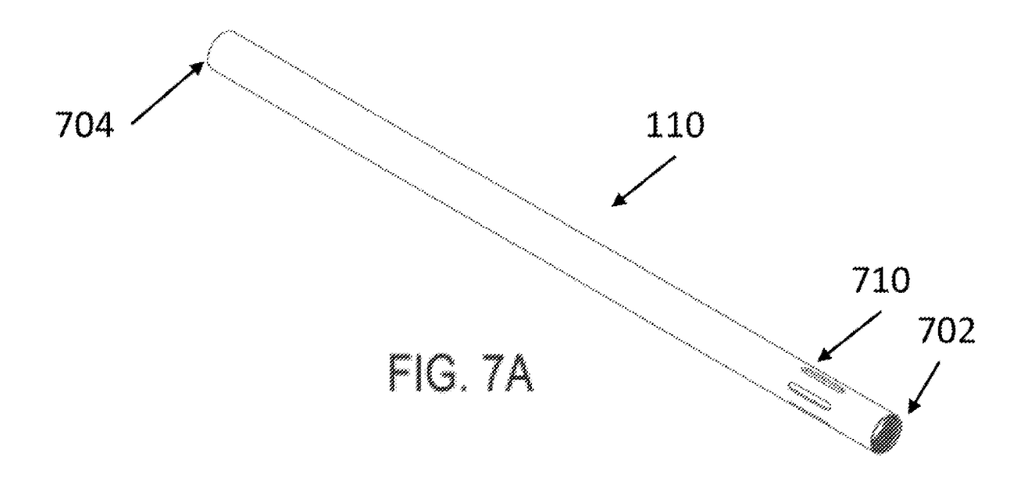
FIGS. 7A and 7B are perspective and cross sectional views of a second pipe according to an embodiment of the invention.
Figure 7B:
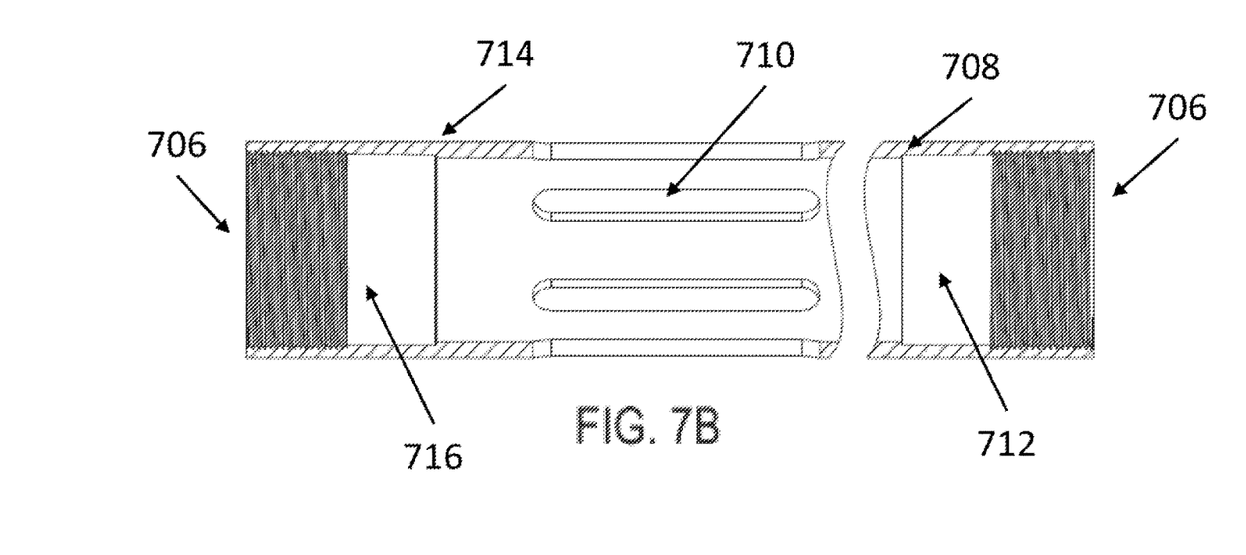

Referring now to FIGS. 7A-B, second external pipe 110 is shown in more detail. Second external pipe 110 has an overall cylindrical shape, with a first end 702 and a second end 704. Both the first and second ends 702 and 704 have internally facing threads 706. Openings 710 in the side wall of second external pipe 110 allow fluid to enter or exit through the sides of second external pipe 110. First end 702 of second external pipe 110 will engage with second end 604 of connector 108.

The second pipe 110 may be the same as the third pipe 114 for ease of manufacturing. To that end, as shown, the interior of second external pipe 110 has a slightly larger diameter at the first end 702 and second end 704, thereby defining lips 708. An interior portion of second external pipe 110 between the first end 702 and the lip 708, and defines a cavity 712. An interior portion of the second end 704 and the lip 714 defines a cavity 716 that will receive the second plug 104. In this embodiment, the cavities 712 and 716 do not serve any particular function for second pipe 110, there presence being an artifact of their utility as part of third pipe 110. The same could thus be omitted to allow for a uniform interior diameter across second pipe 110, although in this design the second pipe 110 would be different from third pipe 114.

Figure 8A:
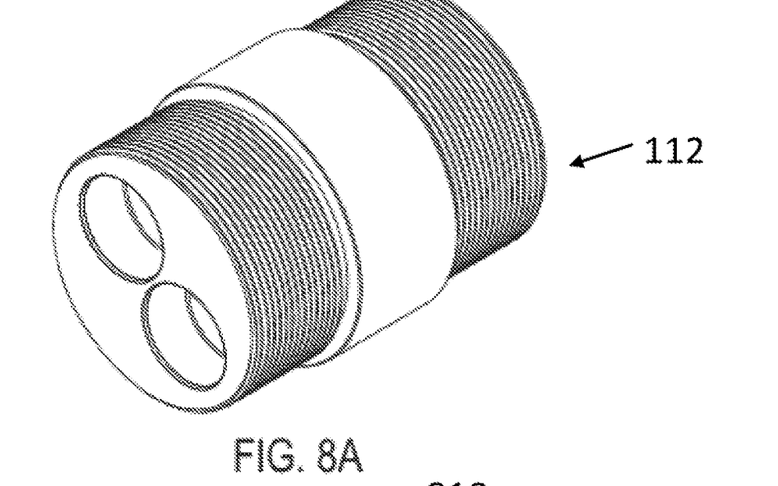
FIGS. 8A-8C are perspective, front, and cross sectional views of a second plug according to an embodiment of the invention.
Figure 8B:
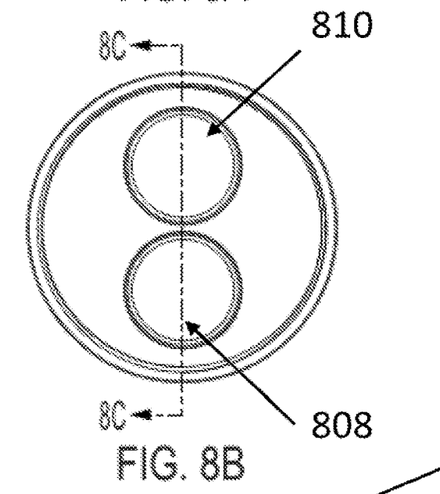
Figure 8C:
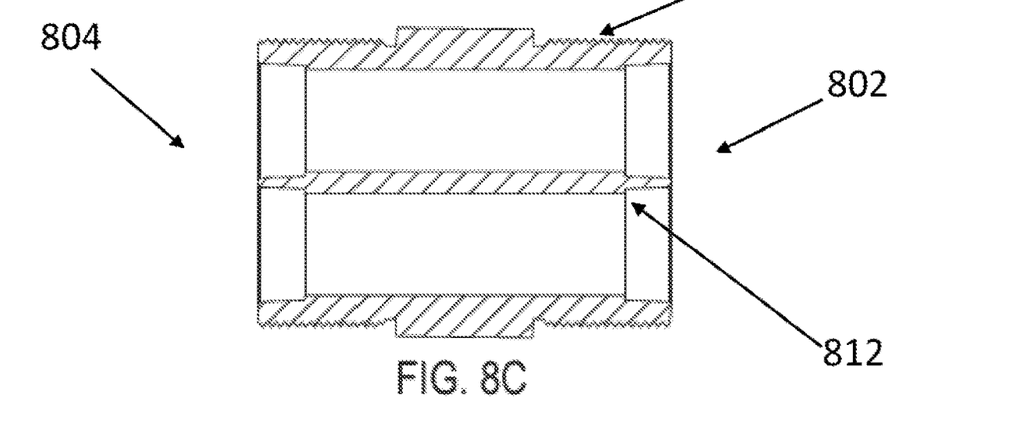

Referring now to FIGS. 8A-8C, second plug 112 is shown in more detail. Second plug 112 has a first end 802 and a second end 804. Both the first and second ends 802 and 804 have externally facing threads 806. First end 802 of second plug 112 will engage with second end 704 of second external pipe 110. Second end 804 of second plug 112 will engage with third external pipe 114.

Second plug 112 has a solid interior with a cylindrical second bore 808 and a third bore 810. Bores 808 and 810 are offset from the center of second plug 112, and preferably is located between the center of second plug 112 and the outer periphery of second plug 112. Bores 808 and 810 may also be positioned symmetrically relative to each other about the central axis of second plug 112. Bore 808 may also be positioned symmetrically relative to first bore 506 of first plug 104.

Each of bores 808 and 810 have a cylindrical interior with at least one recesses 812 along its periphery for receiving O-rings. Bore 808 has an interior size and shape such that, in combination with the O-rings, will snuggly accommodate first internal pipe 120. Bore 810 has an interior size and shape such that, in combination with the O-rings, will snuggly accommodate second internal pipe 122.

Figure 9A:
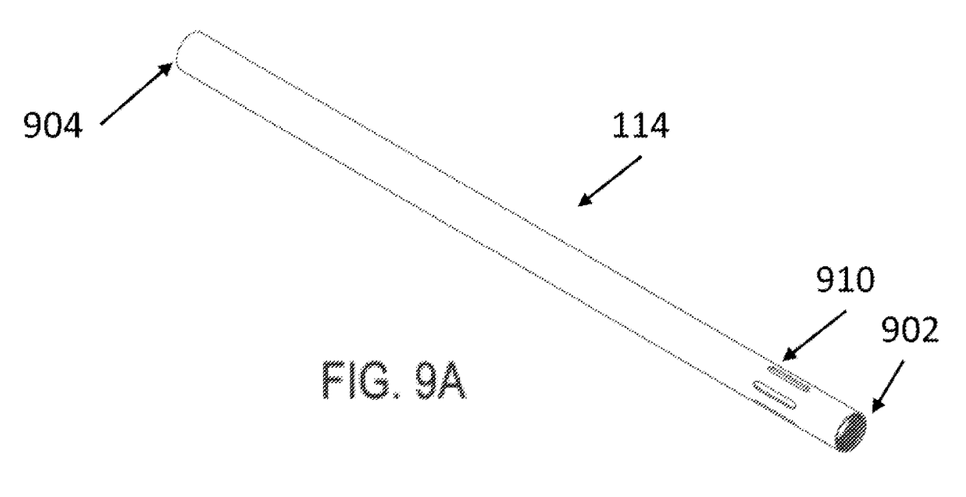
FIGS. 9A and 9B are perspective and cross sectional views of a second pipe according to an embodiment of the invention.
Figure 9B:
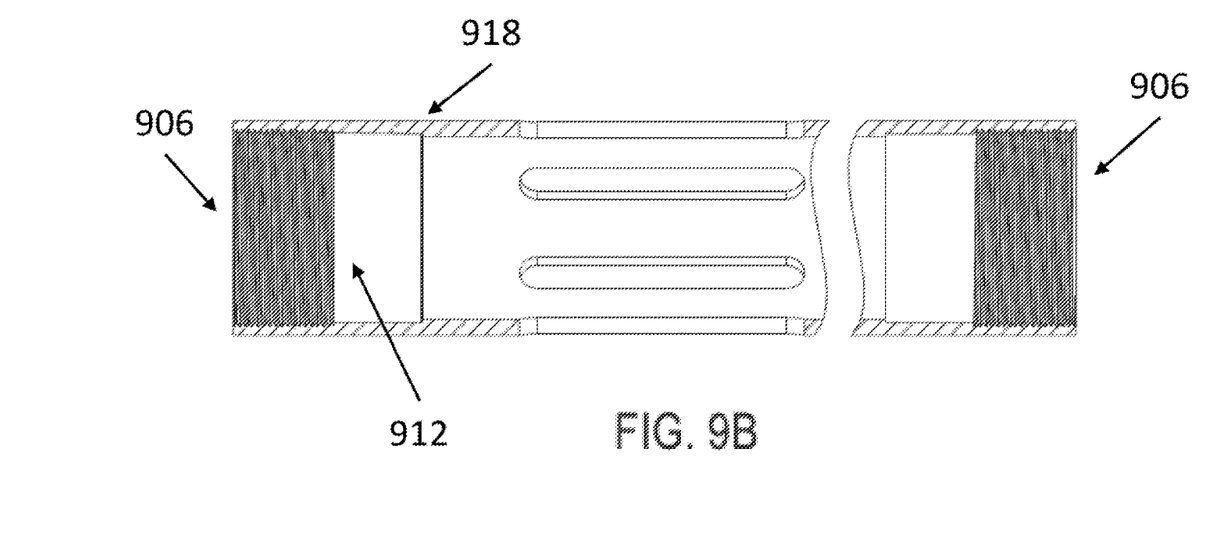

Referring now to FIGS. 9A-9C, third external pipe 114 is shown in more detail. Third external pipe 114 has an overall cylindrical shape, with a first end 902 and a second end 904. Both the first and second ends 902 and 904 have internally facing threads 906. The interior of third external pipe 114 has a slightly larger diameter at the second end 804, thereby defining a lip 908. An interior portion of third external pipe 114 between the second end 904 and the lip 908 defines a cavity 912 that will receive third plug 1116. Openings 910 in the side wall of third external pipe 114 allow fluid to enter or exit through the sides of third external pipe 114. First end 902 of third external pipe 114 connect with second end 804 of second plug 116.

Figure 10:
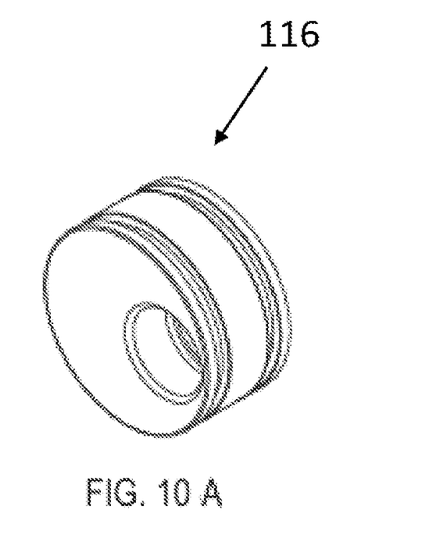
FIGS. 10A-10C are perspective, front, and cross sectional views of a third plug according to an embodiment of the invention.

Referring now to FIGS. 10A-10C, third plug 116 has the same shape as first plug 104 as shown in FIGS. 5A-5C, including a first bore 1006 and groove 1008 that support corresponding O-rings. Third plug 116 with O-rings 504 inserts snuggly into cavity 912 of third external pipe 114. First bore 1006 of third plug 116 in combination with the O-rings 508, will snuggly accommodate second internal pipe 122.

Second connector bushing 118 has the same shape as first connector bushing 102. Second connector bushing 118 connects to second end 904 of third external pipe 114 to lock third plug 116 in place.

First internal pipe 120 extends through the first bore 506 in first plug 104 and the second bore 808 in second plug 112. The ends of first internal pipe 120 may extend past the first plug 104 and second plug 112 within the desired available space, although the desired effects from the pipe may inform as to exactly what length (if any).

Second internal pipe 122 extends through the third bore 810 in second plug 112 and the first bore 506 in third plug 116. The ends of second internal pipe 122 may extend past second plug 112 and third plug 116 within the desired available space, although the desired effects from the pipe may inform as to exactly what length (if any).

The above components can be assembled by screwing together adjacent components and snuggly inserting non-threaded components. The O-rings are mounted in all recesses as appropriate, and all components are manufactures or cut to the desired lengths. The invention is not limited to any assembly sequence, although the following is provided by way of non-limiting example.

First internal pipe 120 is snuggly inserted into second bore 808 of second plug 112. Second internal pipe 122 is snuggly inserted into third bore 810 of second plug 112.

Second end 704 of second external pipe 110 inserts over first internal pipe 120 and connects via threaded engagement to first end 802 of second plug 112. Second end 604 of connector 108 inserts over first internal pipe 120 and connects via threaded engagement to second end 704 of connector 108. Second end 404 of first external pipe 106 inserts over first internal pipe 120 and connects via threaded engagement to first end 802 of connector 108. When so connected, the end of first external pipe 106 extends at least partially into cavity 412 of first external pipe 106.

First plug 104 is positioned to align first bore 506 with first internal pipe 120. First plug 104 is then inserted into cavity 412, which causes first internal pipe 120 to insert into first bore 506 of first plug 104. Second end of first connector bushing 102 connects via threaded engagement with first end 402 of first external pipe 106.

First end 902 of third external pipe 114 inserts over second internal pipe 122 and connects via threaded engagement with second plug 112. When so connected, an end of second external pipe 122 extends at least partially into cavity 912 of third external pipe 114.

Third plug 116 is positioned to align first bore 506 with second internal pipe 122. Third plug 116 is then inserted into cavity 912, which causes second internal pipe 120 to insert into first bore 506 of third plug 116. Second end 304 of second connector bushing 118 connects via threaded engagement with second end 904 of third external pipe 114.

Figure 11:
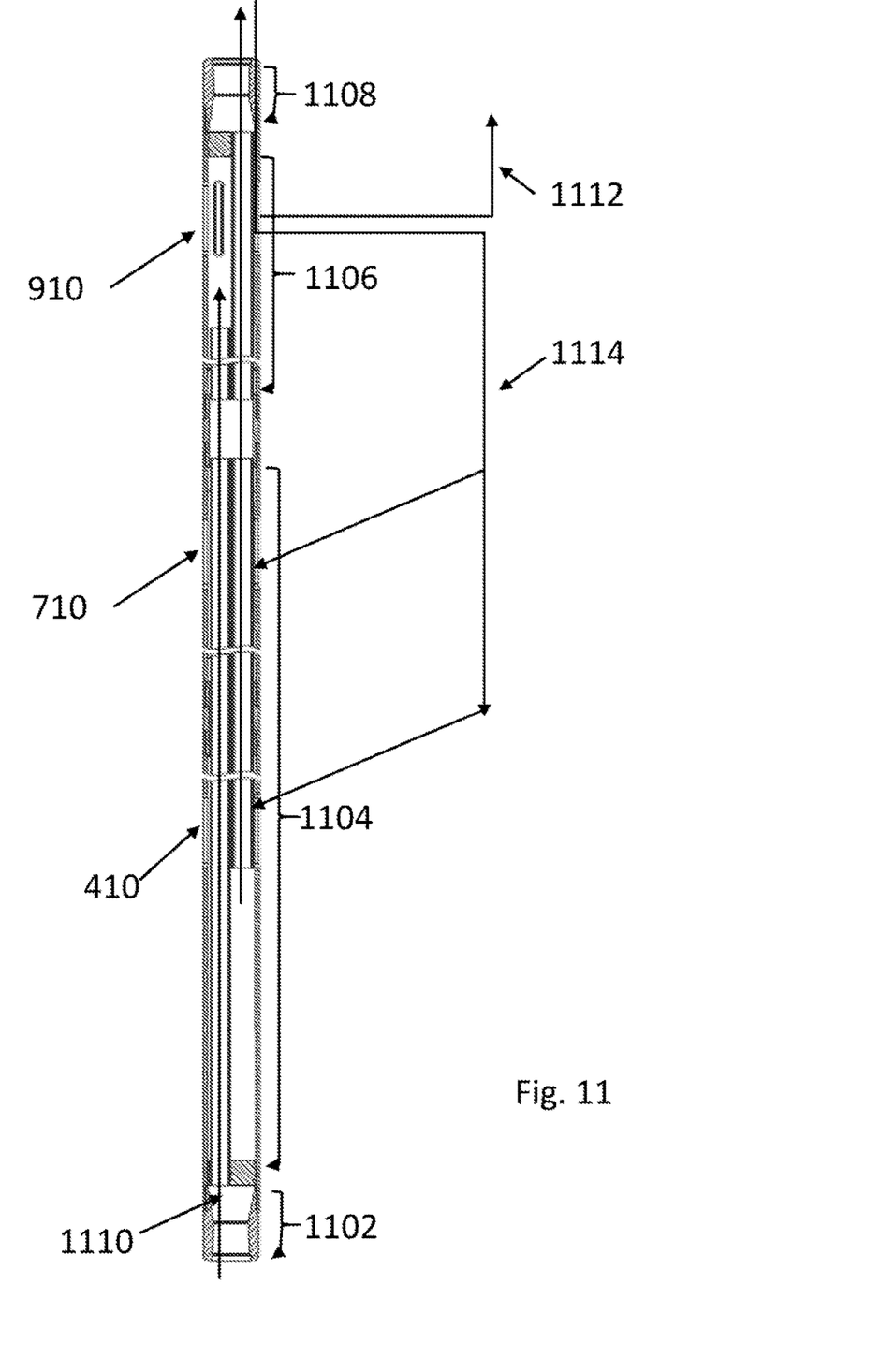
FIG. 11 shows the flow a fluid through the embodiment of FIG. 1.

Referring now to FIG. 11, gas separator 100 in its assembled state defines four adjacent and isolated fluid chambers in which fluid cannot flow internally directly between the chambers. The first chamber 1102, at the fluid receiving end of gas separator 100, is the interior of first connector bushing 102. The second chamber 1104 is the space between the first plug 104 and the second plug 112, within the first external pipe 106, the connector 108, and the second external pipe 110. The third chamber 1106 is the space between second plug 112 and the third plug 116, within the third external pipe 114. The fourth chamber 1108 is the interior of second connector bushing 118.

At a chamber level, fluid 1110 is initially received in the first chamber 1102 under pressure from surface pumps. Fluid 1110 proceeds directly to third chamber 1106 via first internal pipe 120, without interacting with the interior of second chamber 1104; as discussed below, fluid 1110 releases gas to create gas 1112 and degassed fluid 1114. Gas 1112 and degassed fluid 1114 exits the third chamber 1106 via the openings 910 in the side walls of third external pipe 114. When in the orientation of FIG. 11 (top is upward toward the surface, bottom is downward toward the underground fluid), released gas 1112 will travel along a gaseous pathway upward to the surface along the exterior of third pipe 114 above openings 910. Likewise, degassed fluid 1114 flows via gravity along the exterior of third pipe 114 below openings 910, and along the exterior of second external pipe 110 and first external pipe 106. Degassed fluid 1114 reenters gas separator 100 into second chamber 1104 via openings 410 and 710. The degassed fluid 1114 proceeds directly to fourth chamber 1108 via second internal pipe 122, without interacting with the interior of third chamber 1106. The degassed fluid 1114 is then pumped to the surface using known methodologies not discussed further herein.

At a component level, the gas separator 100 operates as follows with respect to FIGS. 2 and 11. Under applied pressure from surface pumps, fluid 1110 enters at first connector bushing 102. Due to first plug 112, the only fluid pathway out of first connector bushing 102 is through first internal pipe 120. The fluid pathway from first internal pipe 120 carries the fluid 1110 to the interior of third external pipe 114, passing through but not interacting with the interior of first external pipe 106, connector 108 and second external pipe 110.

Since the diameter of first internal pipe 120 is smaller than first connector bushing 102, the fluid moves with significantly more speed through first internal pipe 120. Fluid 1110 emerges from first internal pipe 120 into the interior of third external pipe 114 like a geyser, splashing against the interior walls of third external pipe 114 and then falling by gravity. Much like opening a shaken soda bottle, the agitation from the high speed of fluid flow, geyser eruption, and interaction with the surfaces agitates the fluid, causing gas 1112 to separate leaving degassed fluid 1114.

Since third external pipe 114 is closed at its ends by the second and third plugs 112 and 116, openings 910 in third external pipe 114 are the available fluid pathways to exit third external pipe 114. When in a vertical orientation in the well as shown in FIGS. 2 and 11, the degassed fluid 1114 flows downward from gravity along the exterior of third, second and first external pipes 114, 110 and 106, respectively, while released gas 1112 rises to the surface outside of gas separator 100.

Openings 410 and 710 allow the degassed fluid 1114 to reenter the first and second external pipes 106 and 110. The transition may further agitate the degassed fluid 1114 to release even more suspended gas 1112, which exits via openings 410 and 710 to rise to the surface.

The degassed fluid 1114 eventually collects at the bottom of first external pipe 106 near the open end of second interior pipe 122. Fluid pressure pushes the degassed fluid 1114 up through the second interior pipe 122 into second connector bushing 118. Fluid collection components connected to the second connector bushing 118 collect the degassed fluid 1114 as is known in the art.

As noted above, openings 410, 710, and 910 allow the fluid to enter and leave gas separator 100. The figures show these openings as a collection of four slots equally spaced around the perimeter of the corresponding external pipes 106, 110, and 114. However, the invention is not so limited to any number, size, shape, and/or placement of the openings.

The various pipes as described herein may be made of a single unitary pipe, or connected sub-components. By way of non-limiting example, third external pipe 114 or first internal pipe 120 could be made from smaller sections of pipe connected via connectors (akin to the manner in first external pipe 106, connector 108, and second external pipe 110 collectively define a pipe). Similarly, collections of pipes (e.g., first external pipe 106, connector 108, and second external pipe 110) may be a unitary pipe rather than separate connected components.

Figure 12:
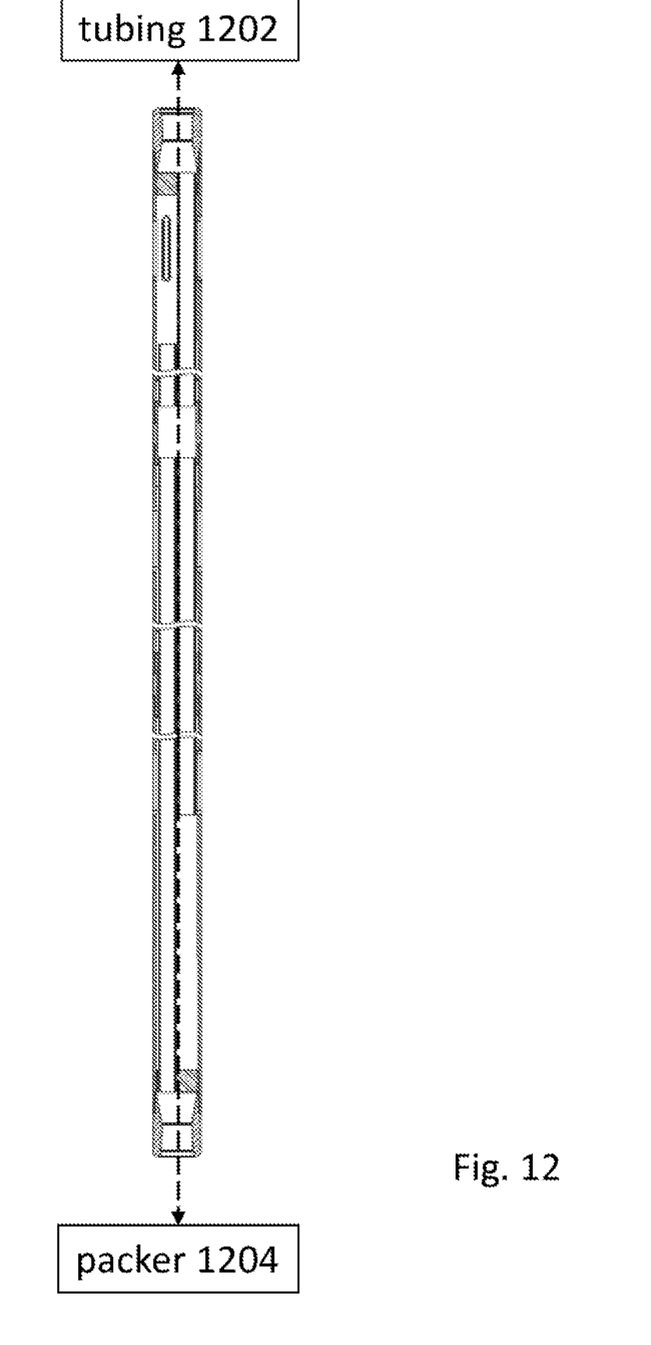
FIG. 12 shows components in the fluid flow upstream and downstream from an embodiment of the invention.

Referring now to FIG. 12, gas separator 100 sits between production tubing 1202 and packer 1204, although the invention is not limited to the adjacent upstream or downstream components. Threads in first connector bushing 102 and third connector bushing 118 are sized to connect to such components to facilitate fluid flow, either directly or through intervening components.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A gas separator for removing suspended gas from a fluid, comprising:
   a length of exterior pipe;
   a first connector bushing at a first end of the exterior pipe, and a second connector bushing at a second end of the exterior pipe;
   a first plug having a first bore, the first plug being disposed in a cavity within the first end of the length of the exterior pipe and held in place by the first connector bushing;
   a second plug having first and second bores, the second plug being disposed between the first and second ends of the length of exterior pipe;
   a third plug having a first bore, the third plug being disposed in a cavity within the second end of the length of the exterior pipe and held in place by the second connector bushing;
   a first interior pipe extending from the first bore of the first plug to the first bore of the second plug;
   a second interior pipe extending from the second bore of the second plug to the first bore of the third plug;
   a sidewall of the length of exterior pipe having at least one opening above and below the second plug;
   wherein a fluid received in the first connector bushing moves through the first interior pipe into an interior portion of the length of exterior pipe, and agitation from corresponding emergence of the fluid causes the fluid to separate into released gas and degassed fluid;
   wherein released gas exits the length of exterior pipe though one of the at least one openings in the sidewall of the length of exterior pipe above the second plug;
   wherein degassed fluid exits the length of exterior pipe though the one of the at least one openings in the sidewall of the length of exterior pipe above the second plug, reenters the length of exterior pipe though one of the at least one openings in the sidewall of the length of exterior pipe below the second plug, and moves through the second interior pipe into the second connector bushing.

2. The gas separator of claim 1, wherein the length of exterior pipe is defined by individually connected sections of exterior pipe.

3. The gas separator of claim 1, wherein the second plug connects two adjacent sections of exterior pipe.

4. The gas separator of claim 1, wherein the first and second bores of the second plug are offset from a central axis of the second plug.

5. The gas separator of claim 4, wherein the first and second bores of the second plug are disposed symmetrically relative to each other about the central axis of the second plug.

6. The gas separator of claim 1, wherein the first bore of the first plug is offset from a central axis of the first plug.

7. The gas separator of claim 1, wherein the first bore of the third plug is offset from a central axis of the second plug.

8. The gas separator of claim 1, wherein the first bore of the first plug and the first bore of the second plug share a first central axis offset from the central axis of the gas separator.

9. The gas separator of claim 1, wherein the first bore of the third plug and the second bore of the second plug share a second central axis offset from the central axis of the gas separator.

10. The gas separator of claim 1, wherein the first interior pipe inserts into the first bore of the first plug.

* * * * *